United States Patent
Hikida et al.

(10) Patent No.: US 8,173,231 B2
(45) Date of Patent: May 8, 2012

(54) HEAT-SHRINKABLE CYLINDRICAL LABEL, LONG CYLINDRICAL BODY, AND CYLINDRICAL-LABEL-ATTACHED ARTICLE

(75) Inventors: Eiji Hikida, Tokyo (JP); Akiko Haga, Tokyo (JP)

(73) Assignee: Fuji Seal International, Inc., Osaka-shi, Osaka (JP)

( * ) Notice: Subject to any disclaimer, the term of this patent is extended or adjusted under 35 U.S.C. 154(b) by 141 days.

(21) Appl. No.: 12/863,094

(22) PCT Filed: Jan. 21, 2009

(86) PCT No.: PCT/JP2009/050810
§ 371 (c)(1),
(2), (4) Date: Jul. 15, 2010

(87) PCT Pub. No.: WO2009/096274
PCT Pub. Date: Aug. 6, 2009

(65) Prior Publication Data
US 2011/0052846 A1    Mar. 3, 2011

(30) Foreign Application Priority Data

Jan. 30, 2008  (JP) ................................. 2008-019706

(51) Int. Cl.
*B65B 53/00* (2006.01)
(52) U.S. Cl. ...................... 428/34.9; 428/35.7; 428/35.8
(58) Field of Classification Search ................. 428/34.9, 428/35.8, 35.7, 36.9, 36.91
See application file for complete search history.

(56) References Cited

U.S. PATENT DOCUMENTS

| 5,340,624 | A  | * | 8/1994 | Sublett ......................... 428/35.8 |
| 7,935,401 | B2 | * | 5/2011 | Opuszko et al. ............. 428/34.9 |
| 7,939,147 | B2 | * | 5/2011 | Dawes et al. ................. 428/34.9 |
| 2003/0021918 | A1 | * | 1/2003 | McKillip ..................... 428/34.1 |
| 2008/0003462 | A1 | * | 1/2008 | Aleyraz et al. .................. 429/13 |
| 2009/0038736 | A1 | * | 2/2009 | Lorence et al. ................. 156/86 |

FOREIGN PATENT DOCUMENTS

| JP | 1-101147 A | 4/1989 |
| JP | 1-250985 A | 10/1989 |
| JP | 5-48216 Y2 | 12/1993 |
| JP | 7-287525 A | 10/1995 |
| JP | 8-22250 A | 1/1996 |
| JP | 9-330030 A | 12/1997 |
| JP | 2004-25704 A | 1/2004 |
| JP | 2007-4091 A | 1/2007 |

OTHER PUBLICATIONS

International Search Report of PCT/JP2009/050810, mailed May 19, 2009.

* cited by examiner

*Primary Examiner* — N. Edwards
(74) *Attorney, Agent, or Firm* — Westerman, Hattori, Daniels & Adrian, LLP

(57) ABSTRACT

The heat-shrinkable cylindrical label of the present invention comprises a cylindrical body formed a heat-shrinkable film into a cylindrical form, and a resin layer laid on a partial region of the cylindrical body, wherein the heat-shrinkable film is a film having a heat shrinkage ratio of 30% or more when the film is heated to 85° C. and having a shrinkage stress of 6.5 MPa or less when the film is heated to 85° C., and the resin layer is a layer which does not substantially deform when the layer is heated to 85° C.
In a cylindrical-label-attached article, wherein the cylindrical label is shrunk by heat to be fitted to an article, the regions where the resin layer is formed rise up as a three-dimensional pattern in a convex form.

7 Claims, 9 Drawing Sheets

HEAT-SHRINKABLE CYLINDRICAL LABEL, LONG CYLINDRICAL BODY, AND CYLINDRICAL-LABEL-ATTACHED ARTICLE

TECHNICAL FIELD

The present invention relates to a heat-shrinkable cylindrical label and a long cylindrical body in each of which a three-dimensional pattern is generated when these are each shrunk by heat, and a cylindrical-label-attached article wherein this cylindrical label is shrunk by heat to be fitted to an article.

BACKGROUND ART

Hitherto, heat-shrinkable cylindrical labels, which are each shrunk by heat to be fittable to a container, have been well known.

Among heat-shrinkable cylindrical labels, known is a heat-shrinkable cylindrical label wherein a three-dimensional pattern is generated when the label is shrunk by heat. This heat-shrinkable cylindrical label is preferable since the label is decoratively good and additionally information can be supplied to visually handicapped persons through their touch senses.

Such a heat-shrinkable cylindrical label is disclosed in Patent Document 1.

Patent Document 1 discloses a three-dimensionally patterned shrunk label obtained by using an ultraviolet curable ink onto a one surface of a heat-shrinkable film to print any pattern, forming the heat-shrinkable film into a cylindrical form to turn the printed surface outward, fitting the cylindrical heat-shrinkable film to the outside of a container, and heating and shrinking the resultant to make the film adhere closely to the container.

In this three-dimensionally patterned shrunk label, its film regions to which the ultraviolet curable ink is applied are not easily shrunk while its film regions to which the ultraviolet curable ink is not applied are shrunk by heat. As a result, in the three-dimensionally patterned shrunk label, the regions where the ultraviolet curable ink is applied rise up as a three-dimensional pattern in a convex form.
[Patent Document 1]
JP-A-9-330030

For the three-dimensionally patterned shrunk label in Patent Document 1, a heat-shrinkable film having a heat shrinkage ratio of about 30% or less is used (paragraph [0008] of Patent Document 1). For this reason, the three-dimensionally patterned shrunk label cannot be fitted closely to a small-diameter region of an article having regions which give a large difference in diameter. The small-diameter region is, for example, a region of a container which is smaller in diameter than a trunk region of the container, such as a shoulder region of the container.

In the meantime, it is supposed that a heat-shrinkable film having a heat shrinkage ratio of 30% or more is used in order to make the film adhere closely to a large-diameter region of an article and a small-diameter region thereof simultaneously. However, when such a heat-shrinkable film, which has a large heat shrinkage ratio, is used in the three-dimensionally patterned shrunk label in Patent Document 1, a three-dimensional pattern in a large convex form cannot be formed.

DISCLOSURE OF THE INVENTION

Technical Problem

An object of the present invention is to provide a heat-shrinkable cylindrical label and a long cylindrical body which can each be made adhere closely to a small-diameter region and further which can each form a good three-dimensional pattern after these are each shrunk by heat.

Another object of the present invention is to provide a cylindrical-label-attached article wherein the heat-shrinkable cylindrical label is fitted to an article.

Solution to Problem

The inventors have made eager researches about a cause of the fact that when a heat-shrinkable film having a large heat shrinkage ratio is used, a three-dimensional pattern in a large convex form cannot be formed. It has then been assumed that the cause is a matter that when the film is shrunk by heat, a painted layer, formed by painting an ultraviolet curable ink layer or the like, is divided into fragments and then broken so that an effect of regulating the shrinkage of the film by the painted layer becomes small. On the basis of this assumption, the inventors have paid attention to a shrinkage stress of a heat-shrinkable film, and then repeated further researches, so as to complete the present invention.

A heat-shrinkable cylindrical label of the present invention comprises a cylindrical body formed a heat-shrinkable film into a cylindrical form, and a resin layer laid on a partial region of the cylindrical body. The heat-shrinkable film is a film having a heat shrinkage ratio of 30% or more when the film is heated to 85° C. and having a shrinkage stress of 6.5 MPa or less when the film is heated to 85° C. The resin layer is a layer which does not substantially deform when the layer is heated to 85° C.

Preferably, a metal-containing layer is laminated onto the resin layer by transferring.

The heat-shrinkable cylindrical label of the present invention has a heat-shrinkable film having a heat shrinkage ratio of 30% or more. Therefore, the heat-shrinkable cylindrical label can be shrunk by heat to be fitted to an article in such a manner that the label is made adhere closely to a small-diameter region of the article.

When this heat-shrinkable cylindrical label is heated to the heat shrinking temperature thereof, the shrinkage of the region where the resin layer is laid is regulated. On the other hand, the region where the resin layer is not laid is shrunk. Therefore, after the heat-shrinkable cylindrical label is shrunk by heat, the region where the resin layer is laid rises up as a three-dimensional pattern in a convex form.

In the heat-shrinkable cylindrical label of the present invention, the shrinkage stress of the heat-shrinkable film is 6.5 MPa or less; thus, when this label is shrunk by heat, a large shrinking force is not easily applied to the resin layer. Therefore, when the heat-shrinkable cylindrical label is shrunk by heat, the resin layer is not easily divided into fragments. Thus, the shrinkage of the region where the resin layer is laid is regulated. As a result, this region rises up outward so that a three-dimensional pattern in a convex form is generated in the heat-shrinkable cylindrical label.

In a preferable heat-shrinkable cylindrical label of the present invention, a surface of the resin layer that is opposite to a surface of the resin layer laid on the cylindrical body is made smooth.

When the surface at the side opposite to the resin layer is made smooth, irregularities in the surface at the side opposite to the resin layer become very small. Therefore, when the heat-shrinkable cylindrical label is shrunk by heat, the resin layer is divided into fragments with more difficulty. Thus, in the heat-shrinkable cylindrical label, a three-dimensional pattern in a convex form is certainly generated.

In another preferable heat-shrinkable cylindrical label of the present invention, on the surface of the cylindrical body that is opposite to the surface of the cylindrical body on which the resin layer is laid, a design printed layer is laid in the region of the surface other than the region thereof which corresponds to the resin layer.

Generally, in a heat-shrinkable cylindrical label, a design printed layer is laid on the inner surface of the cylindrical body thereof. The design printed layer is generally a cured layer of a resin component containing a coloring agent, such as a pigment. For this reason, the design printed layer has an effect of regulating the shrinkage of the heat-shrinkable film in some degree.

In another preferable heat-shrinkable cylindrical label of the present invention, a design printed layer is laid on the surface of the cylindrical body that is opposite to the cylindrical surface on which the resin layer is laid. However, this design printed layer is not laid in the region corresponding to the resin layer.

Accordingly, in another preferable heat-shrinkable cylindrical label, the shrinkage of a partial region of the outer surface or the inner surface of the cylindrical body is regulated by the resin layer at the time of the heat shrinkage of the label while the shrinkage of inner surface region or outer surface region of the cylindrical body which corresponds to the resin layer is not easily regulated. For this reason, a shrinkage difference is generated between the inner and outer surfaces of the cylindrical body. As a result, the region where the resin layer is laid turns into a larger convex form, so as to rise up. Thus, in the preferable heat-shrinkable cylindrical label, a better three-dimensional pattern is generated.

In another preferable heat-shrinkable cylindrical label of the present invention, the cylindrical body is folded into a flat form at two folds opposed to each other, and the resin layer is laid on at a position where the resin layer is put on at least one of the two folds, or at a position near thereto.

Furthermore, in another preferable heat-shrinkable cylindrical label of the present invention, the cylindrical body has two second folds opposed to each other, and the resin layer is laid on at a position where the resin layer is put on at least one of the two second folds, or at a position near thereto.

In another preferable heat-shrinkable cylindrical label, the resin layer is laid on at a position where the resin layer is put on the fold(s) and/or on the second fold(s), or at the position(s) near thereto. Therefore, when the label is shrunk by heat to be fitted to an article, the region where the resin layer is laid rises up in a larger quantity. Thus, in the heat-shrinkable cylindrical label, a three-dimensional pattern in a larger convex form is generated.

Also, in another aspect of the present invention, the present invention provides a long cylindrical body. The long cylindrical body of the present invention has cylindrical bodies, which are each described in above, continuously connected to each other in the longitudinal direction thereof.

Also, in another aspect of the present invention, the present invention provides a cylindrical-label-attached article. In the cylindrical-label-attached article of the present invention, Any one of the heat-shrinkable cylindrical label described in above is shrunk by heat to be fitted to an article, the inner surface of the cylindrical body which corresponds to the resin layer rises up away from the outer surface of the article, and the region where the resin layer is laid forms a three-dimensional pattern in a convex form.

Since the cylindrical-label-attached article of the present invention has the convex three-dimensional pattern, the article is decoratively good and can further supply various pieces of information to visually handicapped persons through their touch senses.

EMBODIMENTS FOR CARRYING OUT THE INVENTION

With reference to the drawings, embodiments of the present invention will be described hereinafter.

In each of the drawings, each region where a resin layer is laid is illustrated into a rectangular shape when viewed from the front for the sake of the convenience. However, the resin-layer-laid region(s) is/are not limited thereto, and may (each) be formed into any shape when viewed from the front. The shape of (each of) the resin layer(s) when the layer is viewed from the front may represent one or more characters or pictures.

In each of the drawings, the resin layer(s) is/are illustrated at one or two substantial central portions of a cylindrical body for the sake of the convenience. However, the position(s) where the resin layer(s) is/are formed is/are not limited to the central portion(s) of the cylindrical body. Thus, the resin layer(s) may (each) be formed at any position. Resin layers may be formed at three or more positions.

Figure 1:
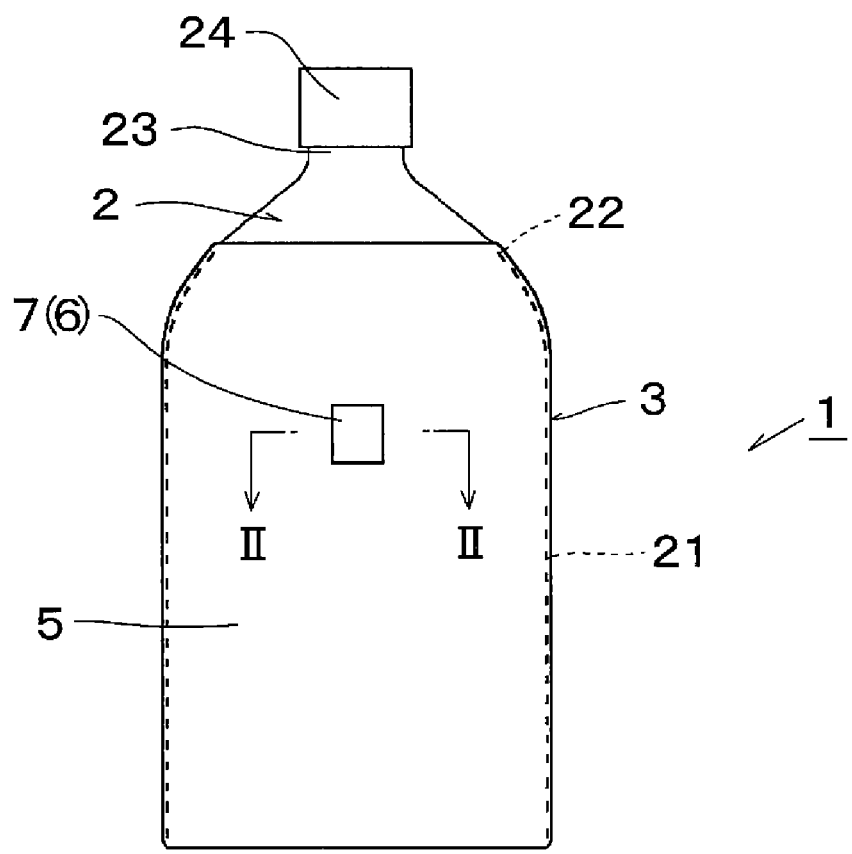
FIG. 1 is a front view illustrating an embodiment of a cylindrical-label-attached container of the present invention.
Figure 2:
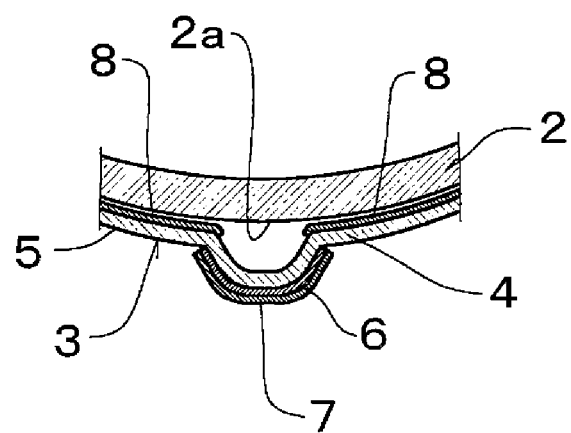
FIG. 2 is a partial enlarged end elevational view wherein the container is cut along line II-II in FIG. 1.

In FIGS. 1 and 2, reference number 1 represents a cylindrical-label-attached article equipped with an article 2, and a heat-shrinkable cylindrical label 3 that is shrunk by heat to be fitted to the article 2 and further has an outer surface having a partial region where a resin layer 6 is laid.

About the fitted heat-shrinkable cylindrical label 3, the inner surface thereof which corresponds to the resin layer 6 rises up away from an outer surface 2a of the article 2. Thus, the region of the label where the resin layer 6 is laid forms a three-dimensional pattern in a convex form (see FIG. 2).

The article 2 is not particularly limited, and examples thereof include various containers, batteries, and medical tools.

The heat-shrinkable cylindrical label 3 has a cylindrical body 5 wherein a heat-shrinkable film 4 is formed into a cylindrical form, a resin layer 6 laid in a partial region of at least one of the outer surface or the inner surface of the cylindrical body 5, a metal-containing layer 7 laminated on the resin layer 6, and a design printed layer 8 laid on the inner surface of the cylindrical body 5.

The heat-shrinkable film 4 is a film having a heat shrinkage ratio of 30% or more when the film is heated to 85° C. and having a shrinkage stress of 6.5 MPa or less when the film is heated to 85° C. Accordingly, the cylindrical body 5 can be shrunk by heat by a ratio of 30% or more at least in the circumferential direction when heated to the heat shrinking temperature thereof. The heat shrinking temperature denotes the temperature of the heat-shrinkable cylindrical label 3 when the heat-shrinkable cylindrical label 3 is shrunk by heat to be fitted to the article 2. Specifically, the heat shrinking temperature corresponds to the temperature at which the temperature of the heat-shrinkable cylindrical label 3 turns to 60° C. or higher, preferably into the range of 70 to 100° C., and more preferably into that of 85 to 100° C.

The resin layer 6 is a layer which contains a resin component and does not substantially deform when the layer 6 is heated to 85° C.

While the individual constituting elements will be separately described hereinafter, the heat-shrinkable cylindrical label 3 of the present invention and the cylindrical-label-attached article 1 thereof will be specifically described.

The article 2 is not particularly limited as far as it is an article to which the heat-shrinkable cylindrical label 3 is shrunk by heat to be fittable.

The article 2 is preferably, for example, a container 2. As a reference number for representing the container, the reference number "2" for representing the article is used.

As illustrated in FIG. 1, the container 2 has a cylindrical trunk region 21, a shoulder region 22 formed over the trunk region 21, a neck region 23 over the shoulder region 22, and a cap unit 24 for covering an opening made in the top of the neck region 23. The illustrated container 2 is a so-called bottle-shaped container, wherein the shoulder region 22 is made narrower at a higher portion thereof. The trunk region 21 of the container 2 may be in a straight trunk form as illustrated in the figure. The straight trunk form denotes a form having substantially the same circumferential length at any position along the vertical direction. The trunk region of the container may be in a form having one or more projection portions (each) projecting outwards in a portion of the cylindrical body (the form being not illustrated). The projection portion(s) is/are, for example, a rib or ribs. On the cylindrical body, a projection portion or plural projection portions are formed. When the plural projection portions are formed, the portions may be uniformly arranged in the trunk region, or may be arranged at random therein.

About the container 2, the difference in diameter between the trunk region 21 and the neck region 23 is preferably relatively large. About the container 2, for example, the circumferential length of the neck region 23 is smaller than the circumferential length of the trunk region 21 (when the trunk region 21 is not in straight trunk form, the circumferential length denotes the length of the circumference having the maximum diameter) by 30% or more.

The heat-shrinkable cylindrical label 3 of the present invention has the heat-shrinkable film 4 having the heat shrinkage ratio of 30% or more. For this reason, the heat-shrinkable cylindrical label 3 can be made adhere closely to the trunk region 21 and the shoulder region 22 of the container 2 (or the trunk region 21, the shoulder region 22 and the neck region 23), which give a large diameter difference, while the label 3 forms a convex three-dimensional pattern.

The use of the heat-shrinkable film 4, the heat shrinkage ratio of which is 30% or more, also makes it possible to make the circumferential length of the heat-shrinkable cylindrical label 3 before the label 3 is shrunk by heat far larger than that of the container 2. When the heat-shrinkable cylindrical label 3 is shrunk by heat to be fitted to the container 2, the label 3 is relatively largely shrunk in the trunk region 21 of the container 2; therefore, a three-dimensional pattern in a relatively large convex form, which results from the resin layer 6 of the label 3, can be formed. Furthermore, the heat-shrinkable cylindrical label 3 can be shrunk by heat to be fitted, up to the shoulder region 22 or the neck region 23, which has a diameter region smaller than the trunk region 21.

The heat-shrinkable cylindrical label 3 is shrunk by heat to be fitted to the substantial whole of the trunk region 21 of the container 2, and a portion of the shoulder region 22 thereof.

About the fitted heat-shrinkable cylindrical label 3, the inner surface of the cylindrical body 5 that corresponds to the region where the resin layer 6 is laid rises up away from the outer surface 2a of the container 2. Furthermore, about the fitted heat-shrinkable cylindrical label 3, the inner surface of the cylindrical body 5 that corresponds to the region where the resin layer is not laid adheres substantially closely to the container 2 along the outer surface 2a thereof (see FIG. 2).

Accordingly, in the cylindrical-label-attached article 1, the region where the resin layer 6 is laid, in the outer surface of the heat-shrinkable cylindrical label 3, projects out in a convex form so as to form a three-dimensional pattern.

About the heat-shrinkable cylindrical label 3, the inner surface of the cylindrical body 5 that corresponds to the region where the resin layer 6 is laid is preferably fitted to the container 2 (article) so as to be faced to a smooth surface of the container 2. The smooth surface refers to a surface which does not substantially have irregularities. The surface which does not substantially have irregularities may be a surface which does not have irregularities that can be recognized with the naked eye.

When the region where the resin layer 6 is laid is positioned in an uneven surface of the container 2, the cylindrical body 5 does not easily undergo heat shrinkage substantially uniformly. Therefore, when the heat-shrinkable cylindrical label 3 is shrunk by heat to be fitted to the container 2, the region where the resin layer 6 is laid may not turn into any large convex form. Therefore, as described above, the heat-shrinkable cylindrical label 3 is preferably shrunk by heat to be fitted to the container 2 so as to face, to the smooth surface of the container 2, the inner surface of the cylindrical body 5 that corresponds to the region where the resin layer 6 is laid.

The heat-shrinkable cylindrical label 3 may be fitted to the cap unit 24 of the container 2, which is not particularly illustrated. In general, the heat-shrinkable cylindrical label 3 fitted to the cap unit 24 of the container 2 is also called a cap seal. The heat-shrinkable cylindrical label 3 used in such a manner is generally fitted to the area extending from the periphery of the upper surface of the cap unit 24 to the neck region 23 of the container 2. The cap seal has a function of sealing the cap unit 24.

The form of the trunk region 21 of the container 2 is not particularly limited, and examples thereof include a substantially cylindrical form, a substantially rectangular cylindrical form, which has four panel surfaces, and a substantially circular truncated cone form. The container 2 is not limited to a bottle-shaped container as described above, and may be, for example, a cup-shaped container, which has an opened upper surface.

The material of the container 2 is not particularly limited, and examples thereof include synthetic resins, paper, metals, glass, and ceramic materials.

A filler to be filled into the container 2 is not particularly limited. When the container is a bottle-shaped container as described above, the filler may be any liquid, for example, drink such as juice, any sanitary product such as a liquid detergent or a shampoo, any medicine such as rubbing alcohol, and any cosmetic product; a granular product such as a granular detergent; and the like.

As illustrated in also FIGS. 3 to 6, the cylindrical body 5 constituting the heat-shrinkable cylindrical label 3 is made by putting both side ends of the heat-shrinkable film 4 onto each other into a cylindrical form to render a certain one direction of the heat-shrinkable 4 the circumferential direction of the cylindrical body 5, and then bonding the portions put onto each other to each other. Hereinafter, the portions put and bonded to each other will be called a center sealing portion 53.

In this cylindrical body 5, perforations 51 for dividing the body 5 into fragments that are known in the prior art, or the like may be made in the vertical direction (and/or the circumferential direction).

The circumferential length of the heat-shrinkable cylindrical label 3 before the label 3 is shrunk by heat is made into a size permitting the label 3 to be fitted to the outside of the trunk region 21 of the container 2. The label 3 is fitted to the outside of the trunk region 21 of the container 2, and then this is shrunk by heat to be fitted thereto, thereby generating a convex three-dimensional pattern.

In order to generate the convex three-dimensional pattern certainly, the heat-shrinkable cylindrical label 3 before the label 3 is shrunk by heat is shrunk to reduce the diameter of the label 3 by a ratio of 5% or more, preferably by a ratio of 8% or more, and more preferably by a ratio of 10% or more. The circumferential length of the heat-shrinkable cylindrical label 3 is appropriately designed in such a manner that the label 3 is shrunk to reduce the diameter thereof by the ratio.

Ratio of the reduced diameter=$(A-B)/A \times 100$ wherein A represents the circumferential length of the label before the label is shrink, and B represents that of the label after the label is shrunk.

Figure 7:
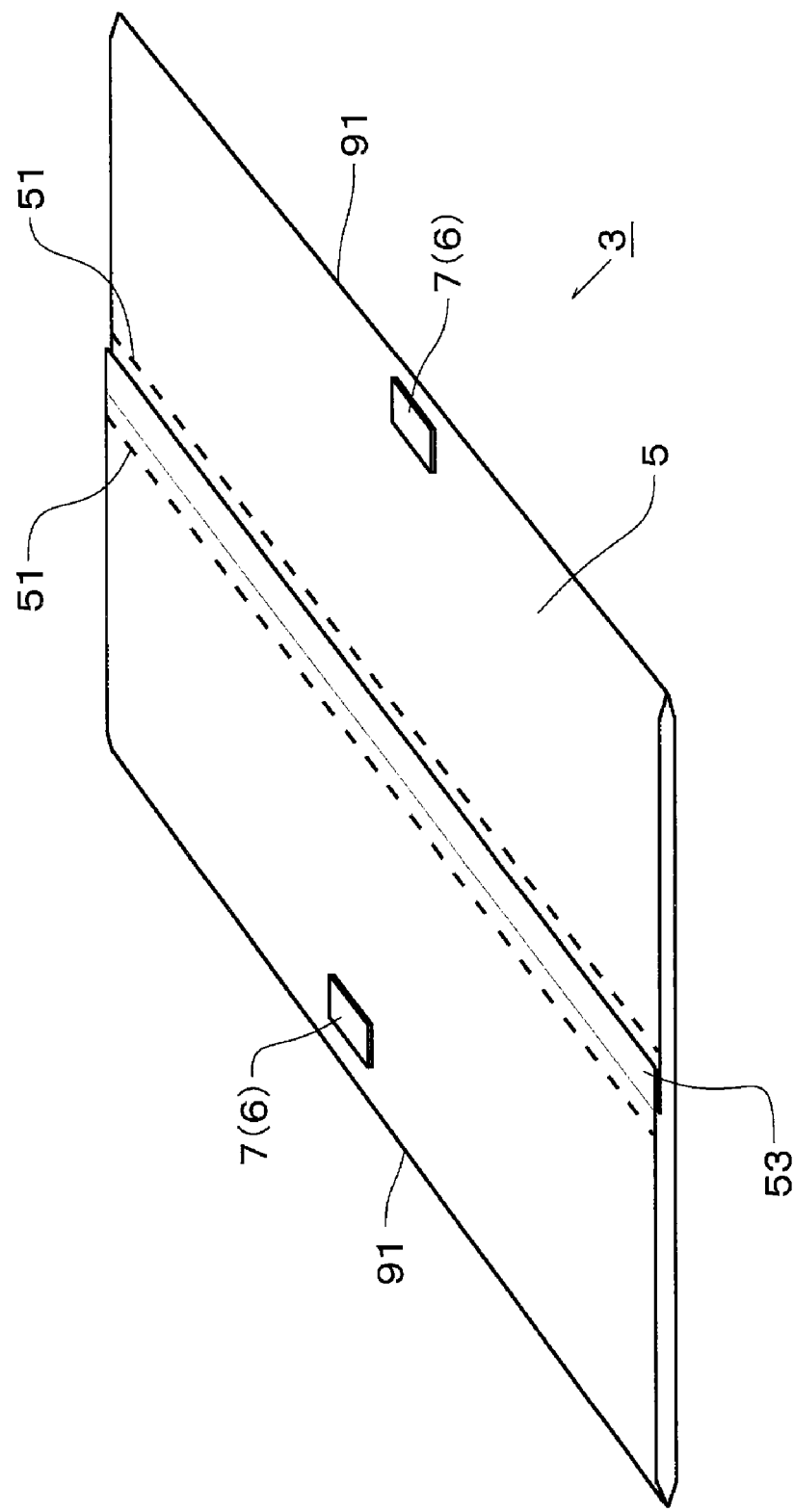
FIG. 7 is a perspective view illustrating an embodiment of a heat-shrinkable cylindrical label folded into a flat form.

Generally, as illustrated in FIG. 7, the heat-shrinkable cylindrical label 3 (cylindrical body 5) is folded into a flat form before the label 3 is fitted to the article 2. In the flatly-folded heat-shrinkable cylindrical label 3, two folds 91 and 91 opposed to each other in the circumferential direction of the label 3 are made.

As illustrated in FIG. 7, the heat-shrinkable cylindrical label 3 may be flatly folded to position the center seal portion 53 near a substantial center in the width direction. In other words, the heat-shrinkable cylindrical label 3 may be flatly folded to position the center seal portion 53 near a substantial center of the area between the two folds 91 and 91. The heat-shrinkable cylindrical label 3 may be flatly folded to make the center seal portion 53 closer to one of the folds, which is not particularly illustrated.

As will be described later, in general, the flat heat-shrinkable cylindrical label 3 is made open into a cylindrical form just before the label 3 is fitted to the article 2, and subsequently the label 3 is refolded. In the heat-shrinkable cylindrical label 3 refolded, second folds are made at positions shifted from the two folds 91 and 91, respectively, in the circumferential direction by predetermined amounts, respectively.

By refolding the heat-shrinkable cylindrical label 3, the heat-shrinkable cylindrical label 3 is not easily returned into a flat form, so that the heat-shrinkable cylindrical label 3 is satisfactorily fitted to the outside of an article such as a container.

The heat-shrinkable film 4 constituting the cylindrical body 5 is a film that is heat-shrinkable at least in a certain one direction at the heat shrinking temperature. The heat shrinking temperature is a temperature making the temperature of the film into the range of 60 to 100° C. The one direction denotes, when the film is formed into a cylindrical form, the circumferential direction thereof (this matter is applied to the following description in the same manner). The heat-shrinkable film 4 is preferably a film capable of being shrunk by heat in some degree in a certain different direction also at the heat shrinking temperature. The different direction is the direction perpendicular to the one direction inside the film plane (this matter is applied to the following description in the same manner).

In the present invention, the heat-shrinkable film 4 is a film having a heat-shrinkage ratio of 30% or more in the one direction when the film 4 is heated to 85° C. The heat-shrinkable film 4 is preferably a film having a heat-shrinkage ratio of 40% or more and more preferably 50% or more in the one direction when the film 4 is heated to 85° C. When the heat-shrinkable film 4 is a film capable of being shrunk by heat in the different direction, the heat-shrinkage ratio of the heat-shrinkable film 4 in the different direction is from 1 to 15% and preferably from 1 to 10% when the film 4 is heated to 85° C.

Furthermore, in the present invention, the heat-shrinkable film 4 is a film having a shrinkage stress of 6.5 MPa or less in the one direction when the film 4 is heated to 85° C. The heat-shrinkable film 4 is preferably a film having a shrinkage stress of 5 MPa or less, and more preferably a film having a shrinkage stress of 4 MPa or less when the film 4 is heated to 85° C. The lower limit of the shrinkage stress is not particularly limited. However, a case where the shrinkage stress is zero is not physically generated; therefore, the lower limit value of the shrinkage stress of the heat-shrinkable film 4 is generally 0.2 MPa.

The heat shrinkage ratio when the film is heated to 85° C. is the ratio between the length of the film before the film is heated (the original length), and the length of the film after the film is immersed in hot water of 85° C. for 10 seconds. The heat shrinkage ratio is calculated by substituting the lengths for the following expression (1);

Heat shrinkage ratio (%)=$(C-D)/C \times 100$  (1)

wherein C represents the original length of the film in the one direction (or the different direction), and D represents the length of the film in the one direction after the immersion (or the different direction after the immersion).

The shrinkage stress when the film is heated to 85° C. refers to the maximum value of the shrinkage stress generated while the film is immersed in hot water of 85° C. for 10 seconds after the film is cut into a length of 200 mm along the one direction and a length of 15 mm along the different direction and then both ends thereof in the one direction are held by means of chucks of a stress measuring instrument. The distance between the chucks is set to 80 mm.

The material of the heat-shrinkable film 4 is not particularly limited, and examples of the material include one kind of thermoplastic resins selected from polyester based resins such as polyethylene terephthalate and polylactic acid; olefin based resins such as polypropylene; styrene based resins such as polystyrene and styrene-butadiene copolymer; cyclic olefin based resins; and vinyl chloride based resins; or a mixture containing two or more kinds of these resins. The heat-shrinkable film may be a laminated film that two or more kinds of films having heat-shrinkable property are laminated, or a laminated film that various kinds of functional layers are laminated on a film having heat-shrinkable property.

The thickness of the heat-shrinkable film 4 is not particularly limited, but generally from 20 μm to 100 μm and preferably 30 μm to 80 μm.

The resin layer 6 is laid on a partial region of the outer surface of the heat-shrinkable film 4. Furthermore, the metal-containing layer 7 is put on the resin layer 6 to be laminated thereon. The lamination order of the resin layer 6 and the metal-containing layer 7 is not particularly limited. For example, the metal-containing layer 7 may be laminated on the outer surface side of the resin layer 6. In contrast, the resin layer 6 may be laminated on the outer surface side of the metal-containing layer 7. The metal-containing layer 7 is preferably laminated on the outer surface side of the resin layer 6 as illustrated in the figures. In addition, the resin layer 6 is preferably laid directly onto the outer surface of the heat-shrinkable film 4.

When the metal-containing layer 7 is laminated on the outer surface side of the resin layer 6, an overcoat layer may be laid on the outer surface of the metal-containing layer 7, which is not particularly illustrated in any figure.

The resin layer 6 is a layer that does not substantially deform when the layer is heated to 85° C.

The phrase "a layer that not substantially deform" when the layer is heated to 85° C. means that "the layer substantially neither shrinks by heat nor softens" when the layer is heated to 85° C.

The resin layer 6, which does not substantially shrink by heat, may be a resin layer having heat shrinkage ratios of 5% or less in a certain one direction thereof and a certain different direction thereof, respectively, and is preferably a resin layer having heat shrinkage ratios of 3% or less in the same directions, respectively.

The one direction and the different direction of the resin layer 6 are equivalent to the one direction and the different direction of the heat-shrinkable film.

The heat shrinkage ratio of the resin layer 6 may be obtained in the same manner for obtaining that of the heat-shrinkable film.

The resin layer 6 that does not substantially soften includes a resin layer 6 in which a depression is not generated when the layer 6 is pushed and pressed with a standard adult man's finger after the layer is immersed in hot water of 85° C. for 10 seconds. The resin layer 6 is, for example, a resin layer the Vicat softening temperature of which is 85° C. or higher, preferably 100° C. or higher, and more preferably 120° C. or higher.

The Vicat softening temperature is a value obtained by making a measurement in accordance with JIS K 7206 (Plastic-Thermoplastic Plastic-Vicat Softening Temperature Testing Method) at a test load of 10 N and a temperature-raising rate of 50° C./h.

The resin layer 6 may be laid at any position of the cylindrical body 5.

Figure 3:
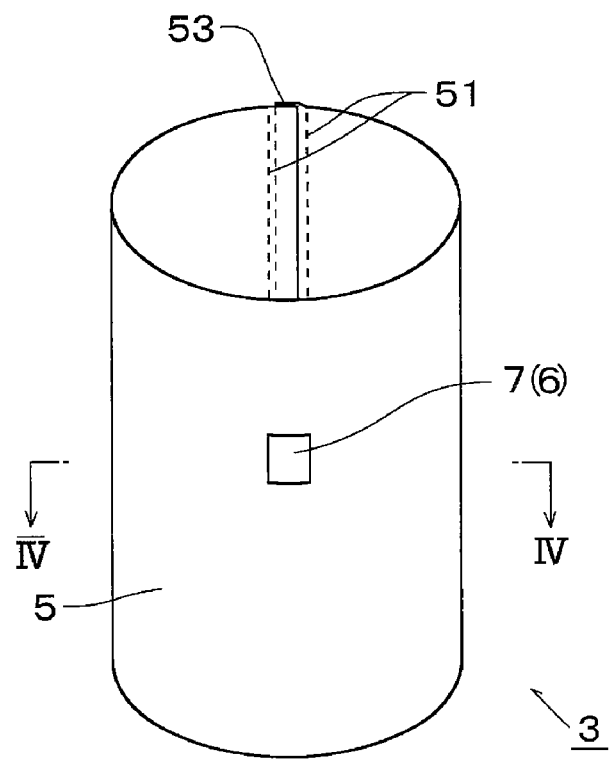
FIG. 3 is a perspective view illustrating an embodiment of a heat-shrinkable cylindrical label.

As illustrated in FIG. 3, the resin layer 6 can be laid at a position opposite to the center seal portion 53 in the circumferential direction of the cylindrical body 5 in one embodiment.

In another embodiment, which is not illustrated in any figure, the resin layer 6 may be laid at a position near to the center seal portion 53.

When the heat-shrinkable cylindrical label 3 is folded into a flat form, the resin layer 6 is preferably laid on at a position where the resin layer 6 is put on at least one fold 91 of the two folds 91 and 91, or at a position near thereto. In particular, the resin layer 6 is more preferably laid at a position near to at least one fold 91 of the two folds 91 and 91 since the resin layer 6 is not folded at the folds 91.

For example, as illustrated in FIG. 7, the resin layer 6 and a different resin layer 6 may be laid at positions near to the two folds 91 and 91, respectively. The resin layers 6 may be laid at positions near to one of the folds 91, which is not particularly illustrated in any figure. Furthermore, the resin layers 6 may be laid at positions near to the folds 91 and on both sides of the folds 91 so as to sandwich the fold 91 therebetween. The resin layers 6 may be laid on at a position where the resin layer 6 is put on the folds 91.

Figure 8:
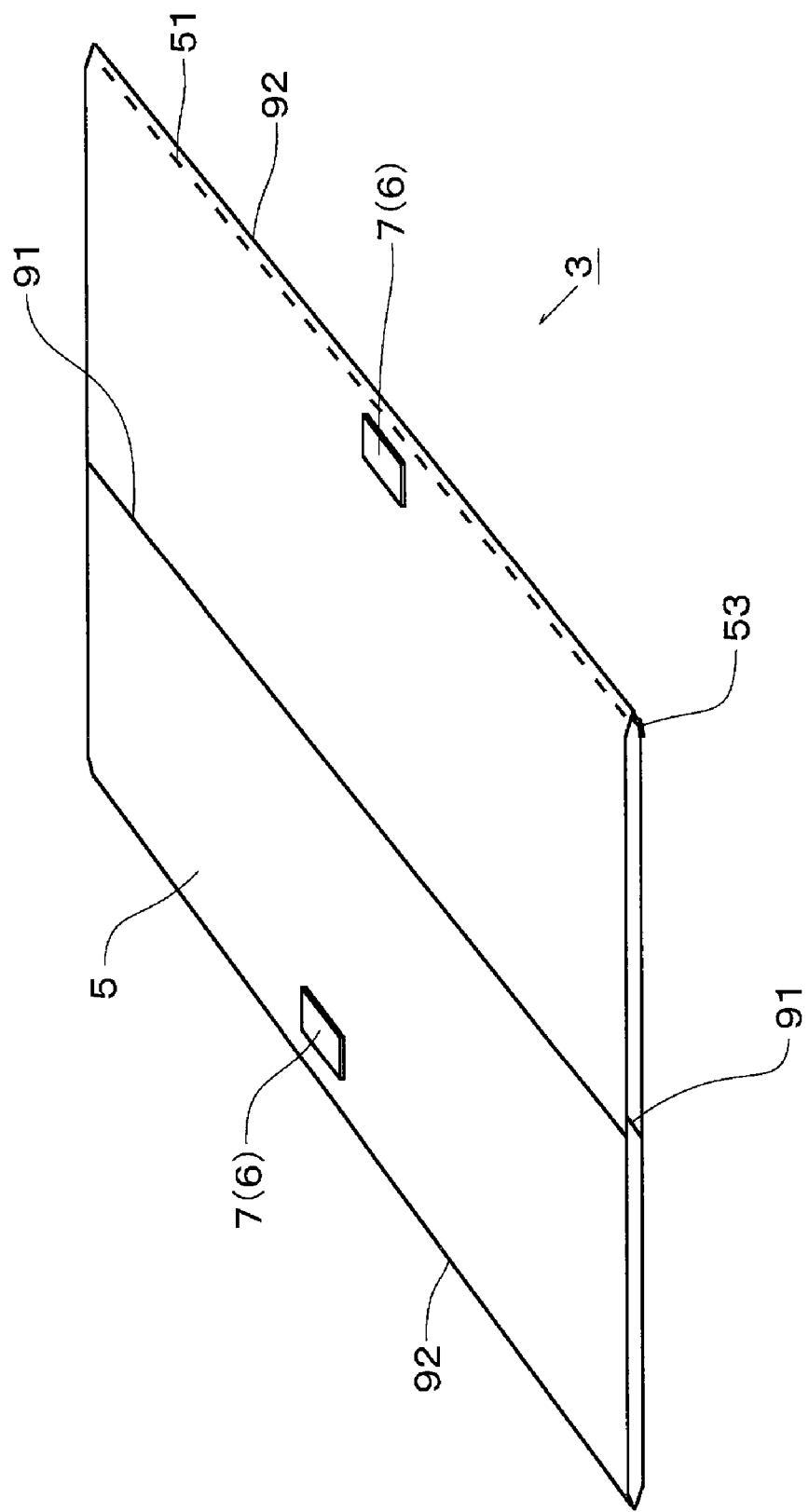
FIG. 8 is a perspective view illustrating another embodiment of a heat-shrinkable cylindrical label folded into a flat form.

As illustrated in FIG. 8, at the time of refolding the flat heat-shrinkable cylindrical label 3, two second folds 92 and 92 are made in this heat-shrinkable cylindrical label 3. In this case, the resin layer 6 may be laid on at a position where the resin layer 6 is put on at least one of the two second folds 92 and 92, or at a position near thereto. In particular, the resin layer 6 is more preferably laid at a position near to at least one second fold 92 of the two second folds 92 and 92 since the resin layer 6 is not folded at the second folds 92.

For example, as illustrated in FIG. 8, the resin layer 6 and the different resin layer 6 may be laid at positions near to the two second folds 92 and 92, respectively. The resin layers 6 may be laid at positions near to one of the second folds 92, which are not particularly illustrated in any figure. Furthermore, the resin layers 6 may be laid at positions near to the second folds 92 and on both sides of the second folds 92 so as to sandwich the second fold 92 therebetween. The resin layers 6 may be laid on at positions where the resin layers 6 are put on the folds 92.

Resin layers 6 may be laid at positions near to the folds 91 and positions near to the second folds 92, respectively.

Any one of the above-mentioned positions each meaning the "position(s) near to (one of) the (second) folds" may include a position where the interval between the edge of (each of) the resin layer(s) 6 and the corresponding fold 91 (or second fold 92) is from 0.3 to 20 mm; and is preferably a position where the interval is from 0.5 to 15 mm.

The shape of the resin layer 6 when the layer is viewed from the front is not particularly limited. The resin layer 6 can represent, for example, a character, a figure or a picture at will in accordance with the shape of the resin layer 6 when the layer is viewed from the front. Specific examples of the shape of the resin layer 6 when the layer is viewed from the front include a trade name, figures for entry into a campaign, a prize result indication of a lot such as prize-winning indication or blank indication, a production date, and Braille for representing a desired one of these information indications. In the heat-shrinkable cylindrical label 3 of the present invention, the region where the resin layer 6 is laid rises up as a convex three-dimensional pattern. Thus, indication information represented on the basis of the shape of the resin layer 6 can be supplied to visually handicapped persons through their touch senses.

The resin layer 6 contains, as a main component, a resin component. The main component refers to a component the mass of which is the largest out of components constituting the resin layer.

The resin component is not particularly limited, and may be a known resin such as a thermoplastic resin, a photocurable resin, or a thermosetting resin.

Any additive may be contained in the resin layer 6 if necessary. The resin layer 6 may contain a coloring agent. However, the resin layer 6 preferably contains no coloring agent since the resin layer 6 is not easily divided into fragments when the label is shrunk by heat.

The method for forming the resin layer 6 is not particularly limited. Examples of the forming method include the following methods (a) and (b):

(a) A resin-containing painting solution is painted into a desired shape (for example, a shape representing a character) onto the outer surface of the heat-shrinkable film 4, and further this is cured.

(b) A resin film punched out into a desired shape (for example, a shape representing a character) is attached onto the outer surface of the heat-shrinkable film 4.

The method (a), wherein a resin-containing painting solution is used, is preferable since the resin layer 6 can easily be formed to have a desired shape.

The resin-containing painting solution is a liquid composition containing a resin component as a main component. Any additive may be blended with the resin-containing painting solution if necessary. The resin-containing painting solution may be a resin-containing painting solution known in the prior art.

The resin-containing painting solution is, for example, solvent-type, emulsion-type, or curing-type one, and is preferably curing-type one. When the solution is classified in accordance with the curing principle of the resin component, examples of the curing-type resin-containing painting solution include ultraviolet curable type, electron beam (EB) curable type, thermosetting type, and two-liquid mixing type solutions. The resin-containing painting solution is preferably ultraviolet curable type one since the solution is widely used as an ultraviolet curable ink.

The resin-containing painting solution may be painted by a printing method known in the prior art, such as flexography, rotary letterpress printing, silk screen printing, or gravure printing. By painting the resin-containing painting solution by the printing method, the resin layer 6 can be formed to have a desired shape.

When the solution is painted by a printing method, the resin-containing painting solution is generally called ink. In general, ink contains a coloring agent such as pigment. However, the resin-containing painting solution in the present invention is preferably an ink containing no coloring agent. The ink containing no coloring agent is called as medium ink also.

The thickness of the resin layer 6 is not particularly limited. If the layer is too thin, it is feared that the shrinkage of the heat-shrinkable film 4 is not sufficiently regulated. Considering this point, the thickness of the resin layer 6 is preferably 1 μm or more and more preferably 3 μm or more. The upper limit of the thickness of the resin layer 6 is usually 20 μm.

A front surface of the resin layer 6 is preferably in a smooth state. The front surface of the resin layer 6 is a surface thereof that is opposite to the surface thereof that is bonded to the outer surface of the cylindrical body 5 (the outer surface of the heat-shrinkable film 4). When the front surface of the resin layer 6 is made smooth in this manner, irregularities in the front surface of the resin layer 6 become very small. Thus, when the heat-shrinkable cylindrical label 3 is shrunk by heat, it is more difficult that the resin layer 6 is divided into fragments.

About the smoothness (the degree of the smooth state) of the front surface of the resin layer 6, the average surface roughness (Ra) is from 0.1 to 2.5 μm and preferably from 0.1 to 1.0 μm. The average surface roughness (Ra) is a value obtained by making a measurement in accordance with JIS B 0601 (1994).

Examples of the method for making the front surface of the resin layer 6 smooth include the following methods (1) to (4):

(1) A metal evaporated film, which will be described later, is transferred onto the resin layer 6 by a cold stamping method or hot stamping method, or some other method.

(2) A resin film excellent in smoothness of the front surface is laminated onto the resin layer 6. In other words, the rear surface of the resin film having a smooth front surface is attached onto the resin layer 6.

(3) A resin film excellent in smoothness of the front surface is used as the resin layer 6, and the surface of the resin film that is opposite to the smooth front surface thereof is attached onto the cylindrical body 5 (the heat-shrinkable film 4).

(4) While the resin layer 6 is in a semi-cured state after the formation of the resin layer 6, the front surface thereof is pushed and pressed in the state that a mirror-plane form pressing plate or mirror-plane form film is brought into contact with the front surface.

The method (1) is a method of pushing a metal evaporated film onto the resin layer 6 to transfer the film thereto. Thus, by pushing the metal evaporated film, the front surface of the resin layer 6 is made smooth.

The metal-containing layer 7 is a thin layer containing a metal.

Examples of the metal-containing layer 7 include a metal evaporated film, a layer wherein fine metal particles are dispersed, and the like.

The metal evaporated film, or the layer wherein fine metal particles are dispersed may be laminated onto the resin layer 6 by a transferring method such as a hot stamping method or a cold stamping method. The metal evaporated film, or the layer wherein fine metal particles are dispersed may be laminated onto the resin layer 6 by a method other than the transferring method.

The layer wherein fine metal particles are dispersed is a fine-metal-particle-containing resin layer wherein the fine metal particles are dispersed in a resin matrix.

The thickness of the metal-containing layer 7 is not particularly limited. When the metal-containing layer 7 is a metal evaporated film, the thickness thereof is preferably from 0.02 to 0.1 μm. When the metal-containing layer 7 is a layer wherein fine metal particles are dispersed, the thickness thereof is preferably from 0.5 to 5 μm.

The design printed layer 8 is laid on the inner surface of the cylindrical body 5.

Figure 6:
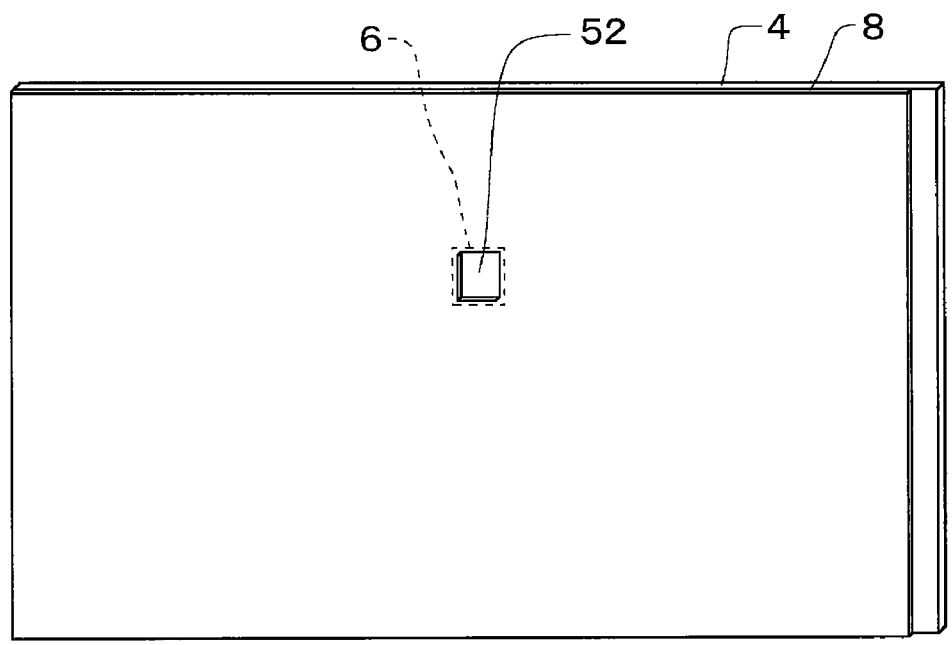
FIG. 6 is a perspective view of a heat-shrinkable film used in a heat-shrinkable cylindrical label when the film is viewed from the inner surface side thereof.

Preferably, the design printed layer 8 is not present in the center seal portion 53 of the cylindrical body 5. As illustrated in FIG. 6, therefore, the design printed layer 8 is laid in the region of the heat-shrinkable film 4 except a band area in one of side end regions of the heat-shrinkable film 4.

Figure 4:
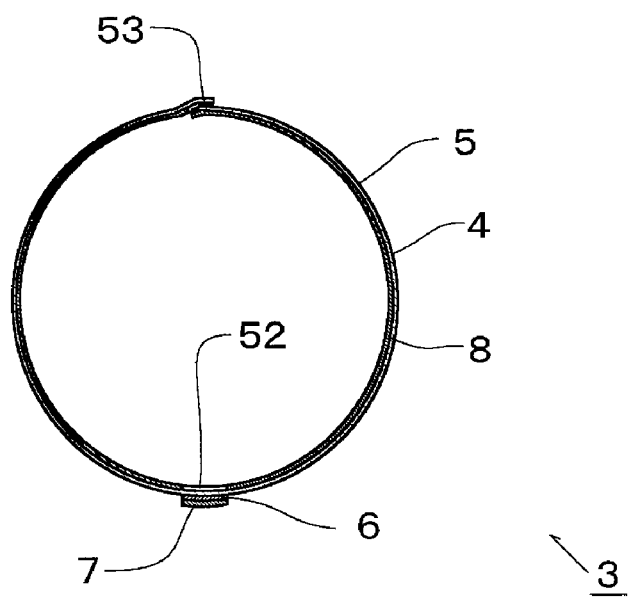
FIG. 4 is a sectional view wherein the label is cut along line IV-IV line in FIG. 3.
Figure 5:
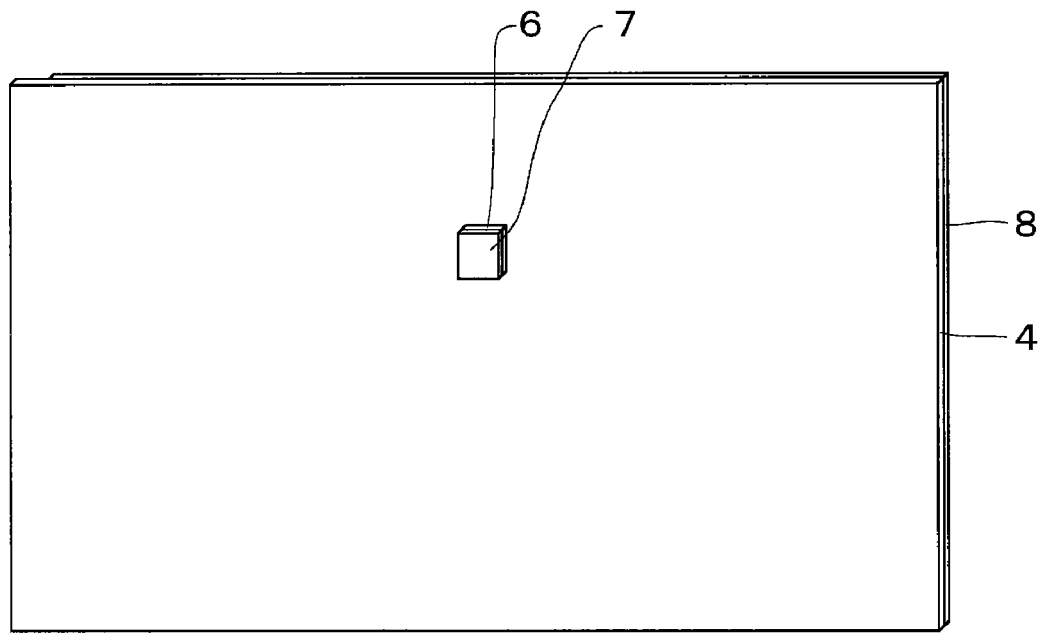
FIG. 5 is a perspective view of a heat-shrinkable film used in a heat-shrinkable cylindrical label when the film is viewed from the outer surface side thereof.

The design printed layer 8 may be laid on the inner surface of the heat-shrinkable film 4 (the inner surface of the cylindrical body 5) so as to form a solid pattern. Preferably, as illustrated in FIGS. 4 and 6, on the inner surface of the heat-shrinkable film 4 (the inner surface of the cylindrical body 5), the design printed layer 8 is laid in the inner surface region other than the inner surface region which corresponds to the resin layer 6.

In other words, the resin layer 6 may be laid at any position of the outer surface of the cylindrical body 5 as described above. In the inner surface region of the cylindrical body 5 where the resin layer 6 is laid, a portion where the design printed layer 8 is not formed (this portion being referred to as a window portion 52) is arranged, and further the design printed layer 8 is arranged in the inner region of the cylindrical body 5 where the resin layer 6 is not laid.

When the design printed layer 8 is laid on the cylindrical body 5 and in the region other than the inner surface region corresponding to the resin layer 6 in this way, the shrinkage of the inner surface region corresponding to the resin layer 6, out of the inner surface of the cylindrical body 5, is not regulated by the design printed layer 8. Accordingly, when the heat-shrinkable cylindrical label 3 is heated, the shrinkage of a partial region of the outer surface of the cylindrical body 5 is regulated by the resin layer 6 while the inner surface region of the cylindrical body 5 which corresponds to the resin layer 6 is not easily regulated. For this reason, a shrinkage difference is generated between the inner and outer surfaces of the cylindrical body 5. As a result, the region where the resin layer 6 is laid turns into a larger convex form to rise up, so that a good three-dimensional pattern is generated in the heat-shrinkable cylindrical label 3.

Furthermore, particularly preferably, the circumferential edge of the window portion 52, where the design printed layer 8 is not formed, is substantially consistent with the circumferential edge of the resin layer 6. By forming the design printed layer 8 to make the circumference of the window portion 52 substantially consistent with that of the resin layer 6 in this way, the shrinkage of a partial region of the cylindrical body 5 is regulated by the resin layer 6 at the time of heating the heat-shrinkable cylindrical label 3 while the outer surface region of the cylindrical body 5 around the resin layer 6 is largely shrunk and further the shrinkage of the inner surface region of the cylindrical body 5 around the resin layer 6 is regulated by the design printed layer 8. Therefore, a shrinkage difference is generated between the inner and outer surfaces of the cylindrical body 5 around the resin layer 6. As a result, the region where the resin layer 6 is laid turns into a larger convex form to rise up, so that a good three-dimensional pattern is generated in the heat-shrinkable cylindrical label 3.

The design printed layer 8 is made of one or more printed layers on which a design indication, such as a trade name, a company name, an operating manual, or a picture, is recorded. In the design printed layer 8, the design indication is printed in a mono-color printing or multicolor printing manner by gravure printing, flexography, or the like. The design printed layer 8 may contain a background printed layer besides the design indication. The background printed layer is laid to make the design indication conspicuous. The background printed layer may be formed, for example, by printing an ink containing a pigment which may be of various types, such as white pigment, into a solid pattern form. The ink that forms the design printed layer 8 is not particularly limited, and is preferably a solvent drying type ink, such as solvent type ink.

The thickness of the design printed layer 8 is not particularly limited, and is preferably, for example, from about 1 to 5 μm.

The design printed layer 8 is relatively thin, and the design printed layer 8 itself is relatively soft. Thus, the design printed layer 8 does not regulate any heat shrinkage of the heat-shrinkable film. Accordingly, the region where the resin layer 6 is laid turns into a convex form to rise up.

The heat-shrinkable cylindrical label 3 is formed by making the heat-shrinkable film 4 into a cylindrical form to turn its side where the resin layer 6 is laid to the outer surface side of the cylindrical body 5.

By fitting the heat-shrinkable cylindrical label 3 into the outside of an article such as a container and then heating this up to the heat shrinking temperature, the label 3 can be fitted to the article 2.

Since the heat-shrinkable cylindrical label 3 has the heat-shrinkable film 4 having a heat shrinkage ratio of 30% or more, the label 3 is shrunk by heat largely to adhere closely to a small-diameter region of the container 2 or some other article.

About this heat-shrinkable cylindrical label 3, the shrinkage thereof is regulated in the region where the resin layer 6 is laid while the label 3 is shrunk by heat largely in the region where the resin layer 6 is not laid. As illustrated in FIG. 2, therefore, the inner surface of the cylindrical body 5 which corresponds to the resin layer 6 rises up away from the outer surface 2a of the container 2 or some other article, so that a largely convex three-dimensional pattern is made in the heat-shrinkable cylindrical label 3.

About the heat-shrinkable film 4 of the heat-shrinkable cylindrical label 3, the shrinkage stress thereof is 6.5 MPa or less; therefore, when this is shrunk by heat, a large shrinkage force can be prevented from being applied to the resin layer 6. Thus, when the heat-shrinkable cylindrical label 3 is shrunk by heat, the resin layer 6 is not easily divided into fragments. As a result, the shrinkage of the region where the resin layer 6 is laid is regulated so that this region rises up outwards largely.

The heat-shrinkable cylindrical label 3 may be obtained through, for example, steps described below.

Specifically, prepared is a long heat-shrinkable film body in a long form wherein plural heat-shrinkable films as described above are continuously connected to each other in the longitudinal direction thereof.

The term "long form" means that the length of any article in the longitudinal direction thereof is sufficiently longer than that of the article in the wide direction thereof. The long form may be, for example, a form having a length in the longitudinal direction that is 10 times or more, preferably 20 times or more, larger than the length thereof in the wide direction.

This long heat-shrinkable film body is made into a cylindrical form to turn its resin layers 6 outwards, and both side ends of the long body are put onto each other. The portions put onto each other are bonded to each other. The resultant bonded portion is a center seal portion 53 (see FIG. 9).

In this way, a cylindrical body in a long form (long cylindrical body 50) is obtained. This long cylindrical body 50 is a product wherein cylindrical bodies 5, which have been described above, are continuously connected to each other in the longitudinal direction thereof.

The resultant long cylindrical body 50 is folded into a flat form. The flatly-folded long cylindrical body 50 has two folds 91 and 91 at positions opposite to each other in the circumferential direction. The folds 91 extend in the longitudinal direction of the long cylindrical body 50.

Figure 9:
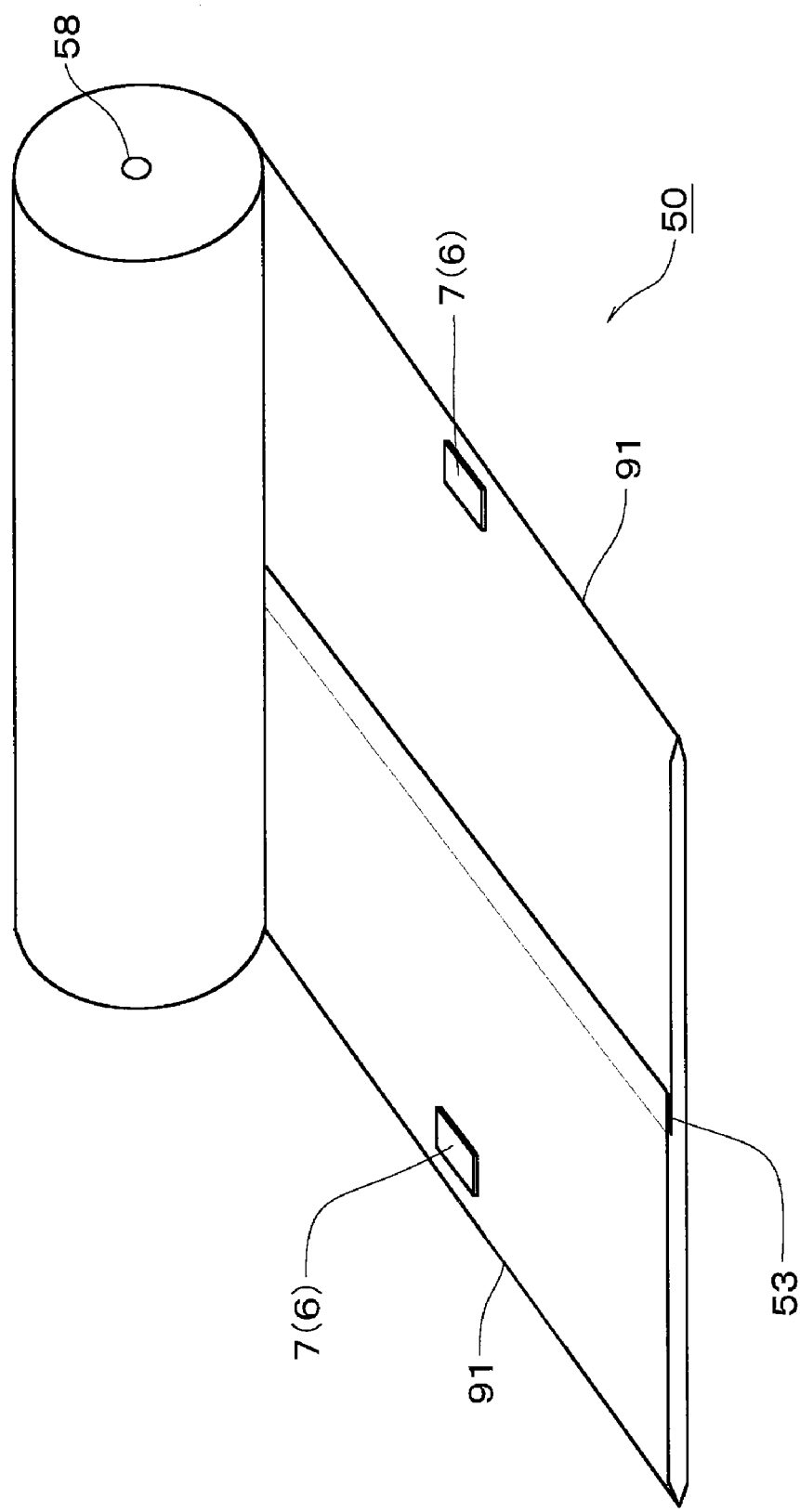
FIG. 9 is a perspective view illustrating an embodiment of a long cylindrical body.

In the preferable long cylindrical body 50, the resin layer 6 is laid on at a position where the resin layer 6 is put on at least one fold 91 of the two folds 91 and 91, or at a position near thereto. The resin layer 6 is preferably laid at a position near to the folds 91. For example, as illustrated in FIG. 9, the resin layer 6 is laid at positions near to the two folds 91 and 91, respectively. The resin layers 6 may be laid at positions near to one of the folds 91, which is not particularly illustrated in any figure. Furthermore, the resin layers 6 may be laid at positions near to the folds 91 and on both sides of the fold 91 so as to sandwich the fold 91 therebetween. The resin layers 6 may be laid on at positions where the resin layers 6 are put on the folds 91. The front surface of the resin layer 6 which is laid on the long cylindrical body 50 is preferably made smooth as described above. Furthermore, the above metal-containing layer 7 is preferably laminated on the resin layer 6. The metal-containing layer 7 is preferably laminated on the outer surface of the resin layer 6.

The flat long cylindrical body 50 is wound around a roll 58, and the resultant is stored and transported.

From the roll 58, the long cylindrical body 50 is pulled out, and the long cylindrical body 50 is cut into a predetermined length, thereby a single heat-shrinkable cylindrical label 3 is produced.

The resultant heat-shrinkable cylindrical label 3 is fitted to the outside of the container 2, and shrunk by heat to be fitted thereto.

The production and the fitting of the heat-shrinkable cylindrical label 3 can be attained by, for example, a first method and a second method described below.

The production and the fitting of the heat-shrinkable cylindrical label 3 are industrially attained by use of a labeler (label fitting machine).

Figure 10:
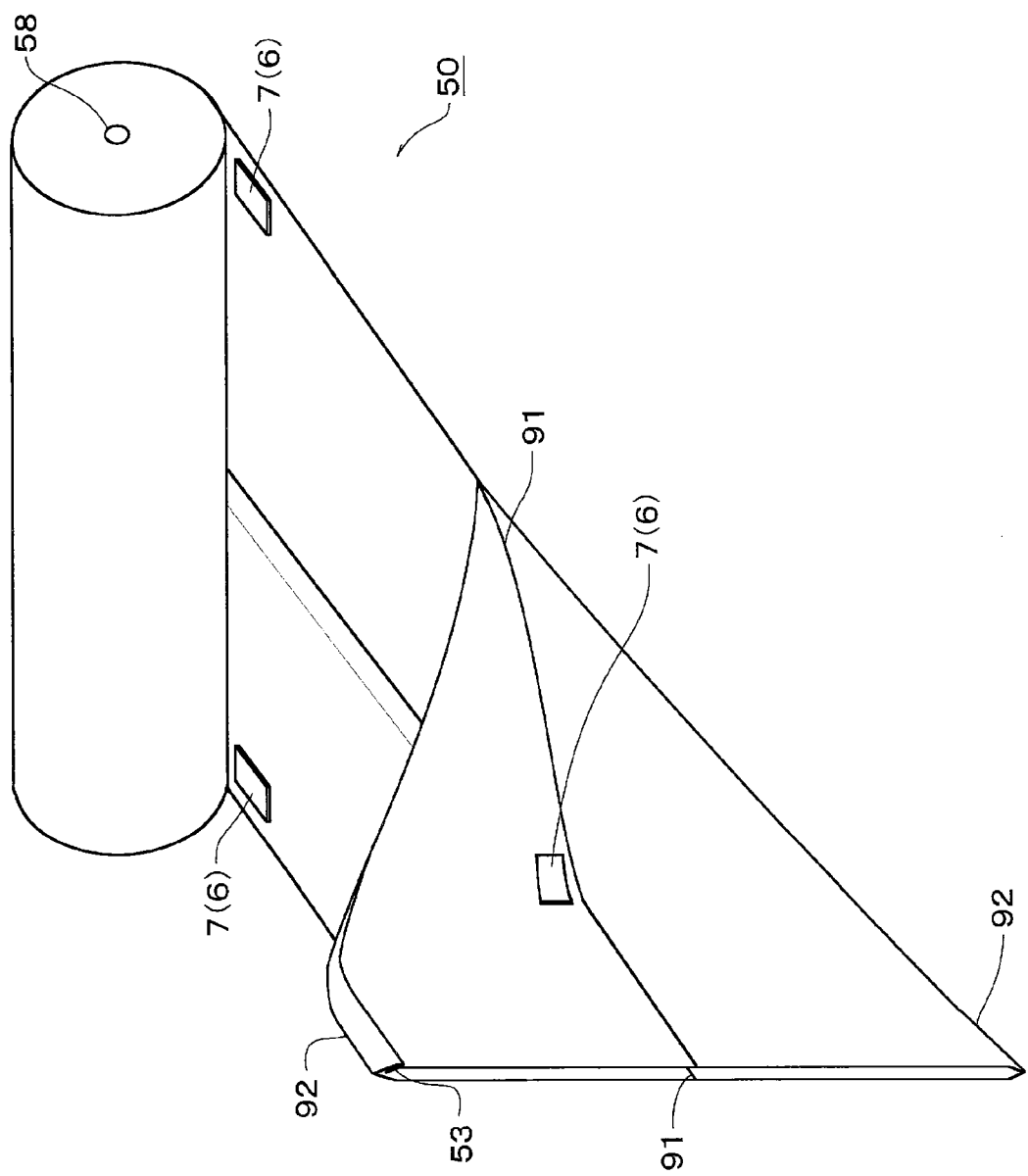
FIG. 10 is a perspective view illustrating a long cylindrical body in the middle of a period when refolding work is conducted.

In the first method, the flat long cylindrical body 50 is opened into a cylindrical form. Thereafter, as illustrated in FIG. 10, the long cylindrical body 50 is refolded into a flat form so as to face the two folds 91 to each other. This work is called "refolding" of the heat-shrinkable cylindrical label 3. By the refolding, second folds 92 and 92 are formed at positions rotated, by about 90 degrees, from the two folds 91 and 91, respectively, in the circumferential direction of the cylindrical body. However, in accordance with the kind of the labeler, the second folds 92 and 92 may not be formed at positions rotated, by about 90 degrees, from the two folds 91 and 91, respectively. For example, the second folds 92 and 92 may be formed at positions rotated, by angles in the range of 20 to 70 degrees, from the two folds 91 and 91, respectively, in the circumferential direction of the cylindrical body.

Thus, in the plane of the long cylindrical body 50, the two folds 91 and 91, and the two second folds 92 and 92, which are each made in the middle between the two folds 91 and 91 are made. The second folds 92 also extend the longitudinal direction of the long cylindrical body 50 in the same manner as in the folds 91.

Figure 11:
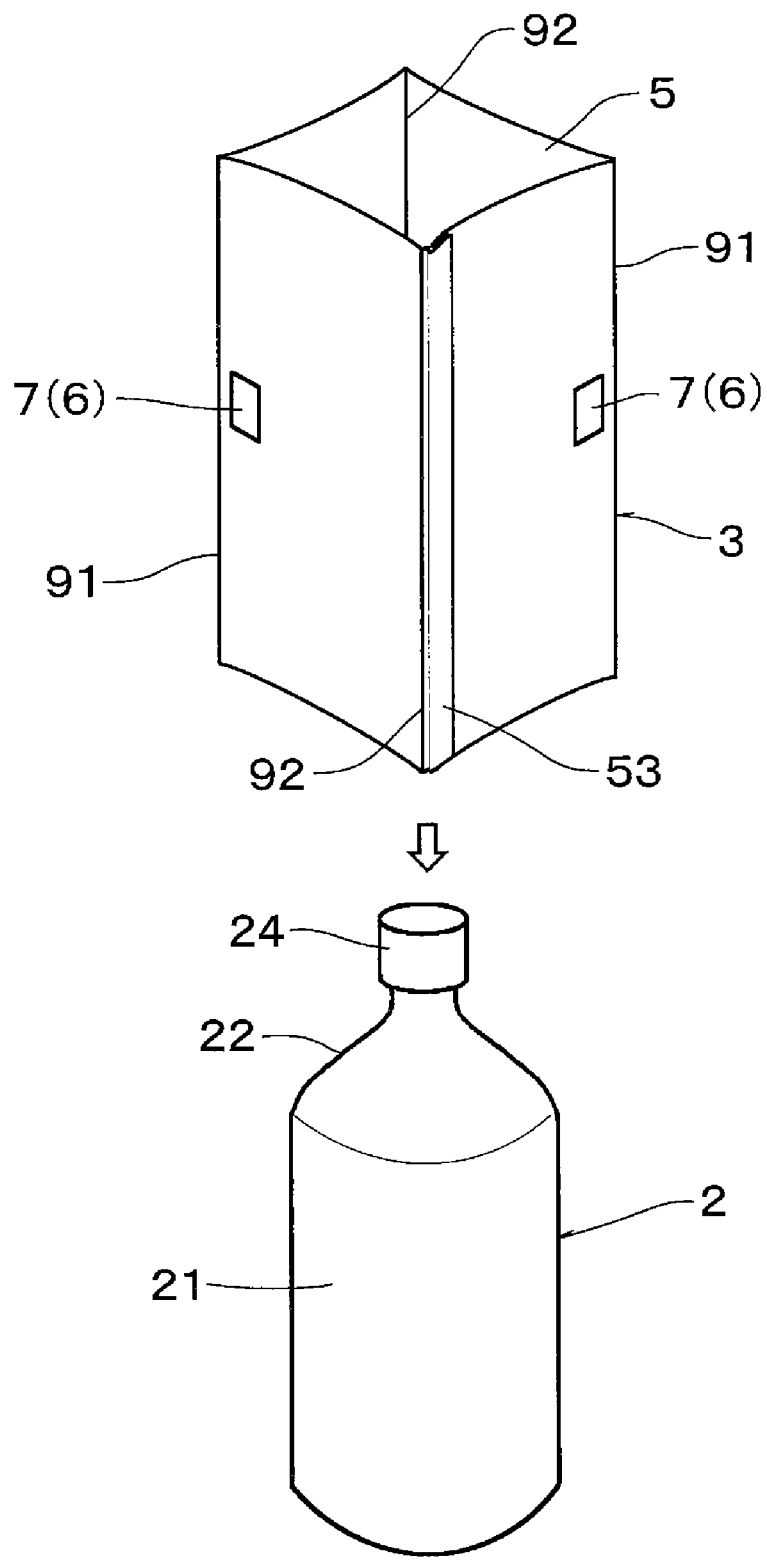
FIG. 11 is a perspective view illustrating a situation that a heat-shrinkable cylindrical label is opened into a cylindrical form before fitted to the outside of a container.

Next, the refolded long cylindrical body 50 is cut into a predetermined length, thereby yielding a single heat-shrinkable cylindrical label 3 as illustrated in FIG. 8. Before the resultant heat-shrinkable cylindrical label 3 is fitted to the outside of the container 2, the label 3 is opened into a cylindrical form as illustrated in FIG. 11. The cylindrically-opened heat-shrinkable cylindrical label 3 turns into a substantially rectangularly cylindrical form, which is bend at the individual folds 91 and 91 and the individual seconds folds 92 and 92. In this state, the heat-shrinkable cylindrical label 3 is fitted to the outside of the container 2. After the fitting, the heat-shrinkable cylindrical label 3 is heated to the heat shrinking temperature. The heated heat-shrinkable cylindrical label 3 is shrunk by heat to adhere closely to the container 2, whereby a cylindrical-label-attached container is yielded.

The method for the heating is not particularly limited as far as the method makes it possible to heat the heat-shrinkable cylindrical label 3 up to the heat shrinking temperature. The heating method is, for example, a method of blowing, thereonto, steam the atmospheric temperature of which is from 80 to 100° C., hot wind the temperature of which is from 120 to 250° C., or the like.

In the second method, the flat long cylindrical body 50 illustrated in FIG. 9 is cut into a predetermined length (without opening the body 50 into a cylindrical form). This manner gives a single heat-shrinkable cylindrical label 3 folded into a flat form, as illustrated in FIG. 7. This flat heat-shrinkable cylindrical label 3 is refolded into a flat form so as to face the two folds 91 and 91 to each other. By the refolding, second folds 92 and 92 are formed at positions rotated, by about 90 degrees, from the two folds 91 and 91, respectively, in the circumferential direction of the heat-shrinkable cylindrical label 3. However, same as described above, the second folds 92 and 92 may not be formed at positions rotated, by about 90 degrees, from the two folds 91 and 91, respectively.

After the refolding, as illustrated in FIG. 11, the heat-shrinkable cylindrical label 3 can be opened into the substantially rectangularly cylindrical form, which is bend at the individual folds 91 and 91 and the individual seconds folds 92 and 92. In this state, the heat-shrinkable cylindrical label 3 is fitted to the outside of the container 2. After the fitting, the heat-shrinkable cylindrical label 3 is heated to the heat shrinking temperature, and a cylindrical-label-attached container is yielded. The method for heating is same as described above.

Figure 12:
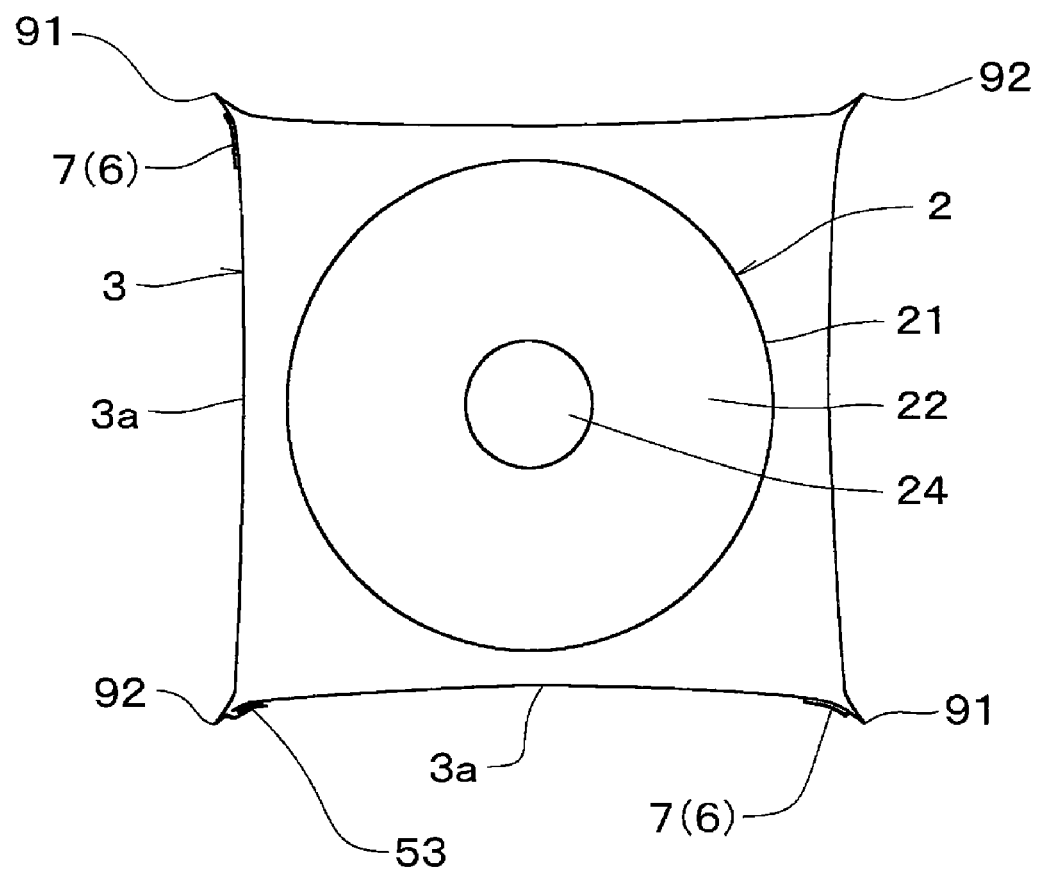
FIG. 12 is a top view illustrating a situation that the cylindrically-opened heat-shrinkable cylindrical label is fitted to the outside of a container.

FIG. 12 is a view, form the above, obtained by a situation that the heat-shrinkable cylindrical label 3 opened into the substantially rectangularly cylindrical form is fitted to the outside of the container 2 in accordance with the first of the second method described above.

As illustrated in FIG. 12, in the heat-shrinkable cylindrical label 3 fitted to the outside of the container 2 before the label is shrunk by heat, regions where the individual folds 91 and 91 and the individual second folds 92 and 92 are made, respectively, are largely apart from the outer surface of the container 2. Specifically, when the opened heat-shrinkable cylindrical label 3 is fitted to the outside of the container 2, regions 3a between the folds 91 and the second folds 92 are positioned near the outer surface of the container 2 while the regions where the individual folds 91 and 91 and the individual second folds 92 and 92 are made, respectively, are largely apart from the outer surface of the container 2. For this reason, the heat-shrinkable cylindrical label 3 fitted to the outside of the container 2 before the label is shrunk by heat has sufficient spaces, between the label 3 and the container 2, in the regions where the individual folds 91 and 91 and the individual second folds 92 and 92 are made, respectively. In other words, the heat-shrinkable cylindrical label 3 has sufficient spaces, between the label 3 and the container 2, in the regions where the resin layers 6 are laid. Thus, when the heat-shrinkable cylindrical label 3 is shrunk by heat, the peripheries of the resin layers 6 are largely shrunk. As a result, the regions where resin layers 6 are laid rise up in the form of larger convexes.

In FIGS. 11 and 12, reference number 21 represents a trunk region of the container; reference number 22 represents a shoulder region of the container; and reference number 24 represents a cap unit of the container. In FIGS. 9 to 12, perforations made in the long cylindrical body and the heat-shrinkable cylindrical label are not illustrated.

In the long cylindrical label 50, the resin layers 6 are laid on at positions where the resin layers 6 are put on the folds 91, respectively, or at positions near thereto. However, instead of this situation, the resin layers 6 may be laid on at positions where the resin layers 6 are put on the second folds 92, respectively, or at positions near thereto. Preferably, the resin layers 6 may be laid at positions near the second folds 92, respectively. Even when the resin layers 6 are laid on at positions where the resin layers 6 are put on the second folds 92, respectively, or at positions near thereto in this manner, the regions where the resin layers 6 are laid rise up into the form of larger convexes for the same reason of the case where the resin layers 6 are laid on positions where the resin layer 6 are put on the folds, respectively, or at positions near thereto.

The above has described various embodiments of the heat-shrinkable cylindrical label, the long cylindrical body, and the cylindrical-label-attached container of the present invention; however, the present invention may be changed into further various embodiments.

For example, in each of the above-mentioned embodiments, the resin layer(s) 6 is/are laid on the outer surface of the cylindrical body 5 or the outer surface of the long cylindrical body 50. However, the present invention is not limited thereto. The resin layer(s) 6 may (each) be laid on the inner surface of the cylindrical body 5, or the inner surface of the long cylindrical body 50. When the heat-shrinkable cylindrical label 3 is shrunk by heat in this case, the inner surface side of the cylindrical body 5 turns into a convex form while the outer surface side turns into a concave form. The resin layers 6 may be laid onto the outer surface and the inner surface of the cylindrical body 5, respectively, or the outer surface and the inner surface of the long cylindrical body 50, respectively. When the resin layers 6 are laid onto the outer surface and the inner surface of the cylindrical body 5, respectively, or the outer surface and the inner surface of the long cylindrical body 50, respectively, the individual resin layers 6 are preferably laid so as not to be faced to each other in the inner and outer surfaces.

When the resin layer(s) 6 is/are (each) laid on the inner surface of the cylindrical body 5, or the inner surface of the long cylindrical body 50, the design printed layer 8 is preferably laid on the outer surface of the cylindrical body 5 or the outer surface of the long cylindrical body 50. When the resin layer(s) 6 is/are (each) laid on the inner surface of the cylindrical body 5, or the inner surface of the long cylindrical body 50, the design printed layer 8 is more preferably laid on the outer surface of the cylindrical body 5 or the outer surface of the long cylindrical body 50 other than the outer surface region which corresponds to the resin layer 6 (window portion), out of the outer surface of the cylindrical body 5 or the outer surface of the long cylindrical body 50.

EXAMPLES

Hereinafter, the present invention will be described in detail by way of Examples and Comparative Example; however, the present invention is not limited to the Examples.

(Various measuring methods)

(1) Measurement of the Heat Shrinkage Ratio of any Film in the One Direction Thereof (in the Main Heat-Shrinkable Direction Thereof):

Any film to be measured was cut out into the shape of a square, 50 mm in the one direction×50 mm in the different direction, and this film piece was immersed in hot water of 85° C. for 10 seconds. Thereafter, the piece was taken out therefrom, and the length thereof in the one direction was measured before and after the immersion. The value was substituted for the following expression to calculate the ratio:

Heat shrinkage ratio (%)=$(C-D)/C \times 100$ wherein C represents the length of the film in the one direction before the immersion, and D represents the length of the film in the one direction after the immersion.

(2) Measurement of the Shrinkage Stress of any Film in the One Direction Thereof (in the Main Heat-Shrinkable Direction Thereof):

Any film to be measured was cut out into the shape of a rectangle, 200 mm in the one direction×15 mm in the different direction, and both ends of this film piece in the one direction were held by means of chucks of a stress measuring instrument (trade name: AUTOGRAPH, manufactured by Shimadzu Corp.) (distance between the chucks: 80 mm). The maximum shrinkage stress out of stresses generated while the piece was immersed in hot water of 85° C. for 10 seconds was measured.

(3) Measurement of the Vicat Softening Temperature:

The Vicat softening temperature was measured in accordance with JIS K 7206 at a test load of 10 N and a temperature-raising rate of 50° C./h.

(Used Materials)

(1) Heat-Shrinkable Film (a):

A polystyrene based film of 50 μm thickness (trade name: "BONSET", manufactured by C.I. Kasei Co., Ltd.).

The heat shrinkage ratio of this film was 53%, and the shrinkage stress was 2.61 MPa.

(2) Heat-Shrinkable Film (b):

A polyvinyl chloride based film of 50 μm thickness (trade name: "HISHIREX", manufactured by Mitsubishi Plastics, Inc.).

The heat shrinkage ratio of this film was 46%, and the shrinkage stress was 3.95 MPa.

(3) Heat-Shrinkable Film (c):

A polylactic acid based film of 50 μm thickness (trade name: "ECO-ROUGE", manufactured by Mitsubishi Plastics, Inc.).

The heat shrinkage ratio of this film was 43%, and the shrinkage stress was 1.73 MPa.

(4) Heat-Shrinkable Film (d):

A polyester based/polystyrene based film of 45 μm thickness (trade name: "HGS", manufactured by Gunze Ltd.).

The heat shrinkage ratio of this film was 58%, and the shrinkage stress was 4.96 MPa.

(5) Heat-Shrinkable Film (e):

A polypropylene based film of 50 μm thickness (trade name: "FANCY WRAP", manufactured by Gunze Ltd.).

The heat shrinkage ratio of this film was 42%, and the shrinkage stress was 5.89 MPa.

(6) Heat-Shrinkable Film (f):

A polyethylene terephthalate based film of 45 μm thickness (trade name: "SPACE CLEAN", manufactured by Toyobo Co., Ltd.).

The heat shrinkage ratio of this film was 70%, and the shrinkage stress was 7.52 MPa.

(7) Ultraviolet Curable Ink:

A pigment-free ultraviolet curable gloss varnish for flexography (trade name: "UV FLEXO VARNISH FV-2", manufactured by T & K Toka Co.).

A cured product (3 μm in thickness, 50 mm in length and 50 mm in width) of this ink had a Vicat softening temperature of 120° C. or higher. Even when the product was immersed in hot water of 85° C. for 10 seconds, no change in the shape was observed.

(8) Transferring Foil:

A piece of transferring foil for cold stamping (trade name: "GLEAM FOIL", manufactured by Murata Kimpaku Co., Ltd.) having an aluminum evaporated film of about 0.04 μm thickness on a piece of releasing paper.

(9) Container:

A commercially available molded container made of polyethylene terephthalate and having a cylindrical trunk region having a diameter of about 62 mm (usually called a PET bottle) (volume: 500 mL).

Example 1

The ultraviolet curable ink was painted into a 4 mm square area of a front surface of the heat-shrinkable film (a) by flexography. The transferring foil piece was laminated onto the ink-painted surface. Next, the ink painted film was irradiated with ultraviolet rays and cured. The cured ink painted film was a resin layer. After the irradiation with ultraviolet rays, the releasing paper piece was peeled from the transferring foil piece to transfer the aluminum evaporated film onto the resin layer. The transferred aluminum evaporated film was a metal evaporated film.

The thickness of the resin layer was 3 μm.

This heat-shrinkable film (a) was made into a cylindrical form to turn the metal evaporated film outward, thereby a heat-shrinkable cylindrical label according to Example 1 was produced. In this heat-shrinkable cylindrical label, the resin layer thereof was arranged to correspond to the trunk region of the container.

The diameter of the cylinder of the heat-shrinkable cylindrical label was 69 mm.

Example 2

A heat-shrinkable cylindrical label according to Example 2 was produced in the same way as in Example 1 except that the heat-shrinkable film (b) was used instead of the heat-shrinkable film (a).

Example 3

A heat-shrinkable cylindrical label according to Example 3 was produced in the same way as in Example 1 except that the heat-shrinkable film (c) was used instead of the heat-shrinkable film (a).

Example 4

A heat-shrinkable cylindrical label according to Example 4 was produced in the same way as in Example 1 except that the heat-shrinkable film (d) was used instead of the heat-shrinkable film (a).

Example 5

A heat-shrinkable cylindrical label according to Example 5 was produced in the same way as in Example 1 except that the heat-shrinkable film (e) was used instead of the heat-shrinkable film (a).

Example 6

A heat-shrinkable cylindrical label according to Example 6 was produced in the same way as in Example 1 except that metal-containing layer was not laminated.

Example 7

A biaxially drawn polyethylene terephthalate based film (trade name: "LUMIRROR", manufactured by Toray Industries, Inc.), 4 mm in length, 4 mm in width and 25 μm in thickness, was bonded to a front surface of the heat-shrinkable film (a) through an acrylic based adhesive (thickness: 15 μm). This biaxially drawn polyethylene terephthalate based film was a resin layer.

This heat-shrinkable film (a) was made into a cylindrical form to turn the resin layer outward, thereby a heat-shrinkable cylindrical label according to Example 7 was produced. In this heat-shrinkable cylindrical label, the resin layer thereof was arranged to correspond to the trunk region of the container.

The diameter of the cylinder of the heat-shrinkable cylindrical label was 69 mm.

Comparative Example

A heat-shrinkable cylindrical label according to Comparative Example was produced in the same way as in Example 1 except that the heat-shrinkable film (f) was used instead of the heat-shrinkable film (a).

(Fitting Test)

In the state that the heat-shrinkable cylindrical label according to each of Examples and Comparative Example was fitted to the outside of the cylindrical trunk region of the container, the label was immersed in hot water of 85° C. for 3 seconds, and then taken out. By the immersion in the hot water, the heat-shrinkable cylindrical label was shrunk by heat to adhere closely onto the container.

Accordingly, the heat-shrinkable cylindrical label was shrunk to reduce the diameter at a ratio of about 10%. About 10%={(69π−62π)/69π}×100

After the fitting, the external appearance of the heat-shrinkable cylindrical label according to each of Examples and Comparative Example was observed with the naked dye. The results are shown in Table 1.

TABLE 1

| | Used film | | Resin layer | Metal evaporated layer | External appearance |
|---|---|---|---|---|---|
| Example 1 | Heat-shrinkable film (a) | 2.61 (MPa) | Formed | Formed | o |
| Example 2 | Heat-shrinkable film (b) | 3.95 (MPa) | Formed | Formed | o |
| Example 3 | Heat-shrinkable film (c) | 1.73 (MPa) | Formed | Formed | o |
| Example 4 | Heat-shrinkable film (d) | 4.96 (MPa) | Formed | Formed | Δ |
| Example 5 | Heat-shrinkable film (e) | 5.89 (MPa) | Formed | Formed | Δ |
| Example 6 | Heat-shrinkable film (a) | 2.61 (MPa) | Formed | Not formed | Δ |
| Example 7 | Heat-shrinkable film (a) | 2.61 (MPa) | Formed | Not formed | Δ |
| Comparative Example | Heat-shrinkable film (f) | 7.52 (MPa) | Formed | Formed | x |

In the column of "External appearance" in Table 1, the meanings of "o", "Δ" and "x" are as follows:

"o": The heat-shrinkable cylindrical label adhered closely to the container along the container, and the region where the resin layer was laid was evidently in a convex form so as to be projected from the trunk region of the container.

"Δ": The heat-shrinkable cylindrical label adhered closely to the container along the container; however, the region where the resin layer was laid was slightly in a convex form so as to be projected from the trunk region of the container.

"x": The whole of the heat-shrinkable cylindrical label (the whole of the label including the region where the resin layer was laid) adhered closely to the container along the container.

What is claimed is:

1. A heat-shrinkable cylindrical label, comprising:
   a cylindrical body formed a heat-shrinkable film into a cylindrical form; and
   a resin layer laid on a partial region of the cylindrical body;
       wherein the heat-shrinkable film is a film having a heat shrinkage ratio of 30% or more when the film is heated to 85° C. and having a shrinkage stress of 6.5 MPa or less when the film is heated to 85° C., and the resin layer is a layer which does not substantially deform when the layer is heated to 85° C.

2. The heat-shrinkable cylindrical label according to claim 1, wherein a surface of the resin layer that is opposite to a surface of the resin layer laid on the cylindrical body is made smooth.

3. The heat-shrinkable cylindrical label according to claim 1, wherein a metal-containing layer is laminated onto the resin layer by transferring.

4. The heat-shrinkable cylindrical label according to claim 1, wherein on a surface of the cylindrical body that is opposite to a surface of the cylindrical body on which the resin layer is laid, a design printed layer is laid in the region of the surface other than the region thereof which corresponds to the resin layer.

5. The heat-shrinkable cylindrical label according to claim 1, wherein the cylindrical body is folded into a flat form at two folds opposed to each other, and the resin layer is laid on at a position where the resin layer is put on at least one of the two folds, or at a position near thereto.

6. A long cylindrical body wherein plural cylindrical bodies which are each as recited in claim 1 are continuously connected to each other in the longitudinal direction thereof.

7. A cylindrical-label-attached article, wherein the heat-shrinkable cylindrical label according to claim 1 is shrunk by heat to be fitted to an article, the inner surface of the cylindrical body which corresponds to the resin layer rises up away from the outer surface of the article, and the region where the resin layer is laid forms a three-dimensional pattern in a convex form.

* * * * *